[19] United States Patent
Lebedev et al.

[11] 4,352,972
[45] Oct. 5, 1982

[54] METHOD OF RESISTANCE FLASH BUTT WELDING

[76] Inventors: Vladimir K. Lebedev, ulitsa Engelsa, 25, kv. 12; Sergei I. Kuchuk-Yatsenko, ulitsa Filatova, 1/22, kv. 47; Valery G. Krivenko, ulitsa Ordzhonikidze, 3, kv. 35; Mikhail V. Bogorsky, ulitsa Ozernaya, 30/51, kv. 120; Vitaly T. Cherednichok, Zadorozhny pereulok, 6, kv. 41; Anatoly A. Toldin, prospekt Nauki, 142/1, kv. 34; Vasily A. Sakharnov, ulitsa Solomenskaya, 41, kv. 93, all of Kiev, U.S.S.R.

[21] Appl. No.: 166,326
[22] Filed: Jul. 7, 1980
[51] Int. Cl.³ .............................................. B23K 11/04
[52] U.S. Cl. ..................................... 219/100; 219/104
[58] Field of Search ................. 219/97, 100, 101, 102, 219/103, 104

[56] References Cited
U.S. PATENT DOCUMENTS 2,298,051 10/1942 Gordon et al. ...................... 219/97
2,324,944 7/1943 Millwood .............................. 219/97
3,479,482 11/1969 Erwin et al. .......................... 219/97
4,164,638 8/1979 Ulmer ................................. 219/100

FOREIGN PATENT DOCUMENTS 37-2162  5/1962  Japan.
984296   2/1965  United Kingdom.
1153002  5/1969  United Kingdom.
1162073  8/1969  United Kingdom.
226052   1/1969  U.S.S.R..

Primary Examiner—C. C. Shaw
Attorney, Agent, or Firm—Fleit & Jacobson

[57] ABSTRACT

A method consists in that the workpieces to be welded together are at first continuously moved towards each other with the welding current on and the ends of the workpieces are fused, the thermal state of the ends being monitored in terms of current, or of power, or of fusion time, or of length of the fused portion. After any of said variables has reached a preselected value which corresponds to the predetermined heating of the contact region, oscillatory movements are superimposed on the movement of one of the workpieces being welded towards the other and the fusion process is carried out till upsetting.

5 Claims, 1 Drawing Figure 4,352,972

METHOD OF RESISTANCE FLASH BUTT WELDING

BACKGROUND OF THE INVENTION

The present invention relates to the art of welding and is specifically concerned with a method of flash butt welding. The invention may be used in resistance flash butt welding of large cross-section workpieces.

A continuous resistance flash butt welding method wherein the welding machine head moves at a constant or a rising speed in the course of fusion is widely known in welding practice.

Although such a welding method offers a high electrical efficiency, its use is restricted to welding workpieces of only certain types of materials, cross-sectional sizes and shapes; it has found practical application mainly for welding thin-sheet structures and workpieces with small compact cross-sections.

A grave disadvantage of this method, which restricts its application, lies in that the initially high thermal efficiency of the fusion process progressively drops as the workpieces to be welded are being heated; this slows down the rate of their heating and therefore increases the fusion loss of metal in attaining the required zone of heating of the end faces of the workpieces. The drop in the thermal efficiency brings about serious difficulties in welding workpieces of low heat conductivity materials as well as thick-walled and compact-section workpieces, because in such cases the thermal efficiency drops at a higher rate.

There is also known a flash butt welding method wherein the workpieces to be welded are repeatedly moved towards and away from each other (Britain Pat. Nos. 1,153,002; 984,296) or one of the workpieces is set in an oscillating motion (Japanese Pat. No. 2,162). In this method, only reciprocating movements are imparted to the workpieces at the heating stage, without continuously drawing them together. This method as well suffers from disadvantages. It features a low electrical efficiency and calls for use of machines with a high electrical capacity. In order to uniformely heat the workpieces to be welded, the faces must closely fit to each other, but even the most careful fitting of the end faces fails to eliminate their nonuniform heating over the section with this welding method.

This nonuniform heating of the workpieces results in welding defects, such as incomplete fusion and dead spots.

There is further known a resistance flash butt welding method wherein the welding machine head is moved at a constant or rising speed and in addition simultaneously oscillated along the direction of movement (USSR Inventor's Certificate) No. 226,052; British Pat. No. 1,162,073; FRG Pat. No. 1,615,324; French Pat. No. 1,517,114). The combination of a continuous movement of the workpieces being welded towards each other with a simultaneous oscillation of one of these greatly increases the welding current and the thermal efficiency of the welding process as against those of the above-mentioned continuous flash welding without oscillation. Owing to this feature, the method under consideration makes it possible to weld thick-walled and compact workpieces with a large cross-section as well as workpieces of low heat conductivity materials.

A disadvantage of this welding method is that during a certain time at the initial stage of welding, while the ends of the work-pieces to be welded are cold or slightly heated, the fusion process is characterized by a current close to the short-circuit one, a power loss for heating the secondary circuit of the welding transformer, and a low electrical efficiency; in welding thick or large cross-section workpieces, this low-efficiency initial stage of welding lasts longer.

SUMMARY OF THE INVENTION

An object of the present invention is to provide a method of resistance flash butt welding, which increases the rate of heating of the workpieces to be welded.

Another object of the invention is to provide a method of resistance flash butt welding, which reduces the power consumption.

Still another object of the invention is to provide a method of resistance flash butt welding, which offers a higher productive capacity.

BRIEF DESCRIPTION OF DRAWING FIGURE

The invention will now be described in more detail, with reference to the FIGURE representing a graphical plot of S (displacement) versus t (time), wherein L stands for the displacement waveform.

DETAILED DESCRIPTION

Figure 1:
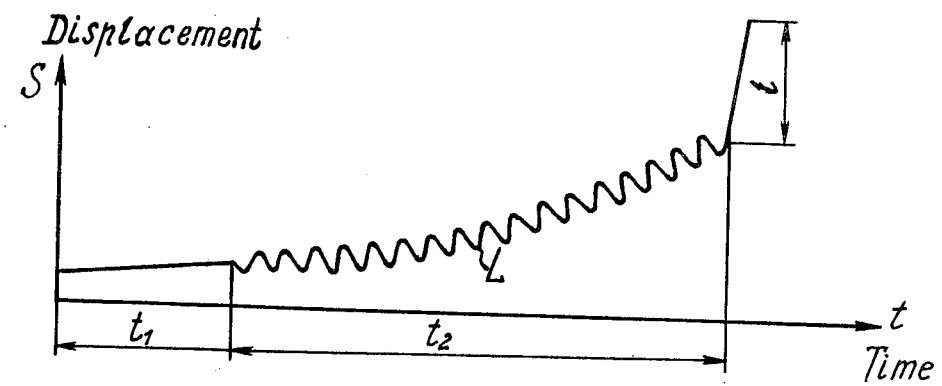

The above objects are attained by that in a method of resistance flash butt welding, the process of fusion till upsetting is effected in two steps; at the first step, the workpieces are continuously fused, i.e. continuously moved towards each other, while measuring the fusion current, power, fusion time, or length of the fused portion, and when one of these variables has reached a preselected value which corresponds to heating of the contact region to 650° to 800° C., the second step is started, which consists in imparting oscillatory movements to at least one of the workpieces in the course of moving the workpieces towards each other.

Such a method cuts down the power consumption and speeds up the rate of heating owing to the fact that the combination of continuously moving the workpieces towards each other with simultaneously oscillating one of these brings about a change (increase) in the workpiece contact area and hence also a change (decrease) in the resistance across contacts (contact), which results in a considerable increase in the welding current. Under these conditions, only small-area contacts explode and hence less heated material is thrown out of the welding zone, which provides for increase in the thermal efficiency as against that of the method of continuous flash welding without oscillation.

The step of moving the workpieces towards each other with oscillating one of them may also be started in a time ranging from 0.2 to 0.3 of the overall welding time and measured from the beginning of the fusion process, or may be started after the total fusion of the workpiece ends has reached 0.2 to 0.3 of the workpiece thickness.

The above-specified relative values of current, power, time, and allowance have been established by the inventors in the course of many experimental weldings of workpieces of various cross-sections and of various materials.

The proposed welding method may also be accomplished in another manner so that, at the second step of moving the workpieces towards each other, the oscillations are terminated before starting the upsetting after the workpiece ends have been fused for a length ranging from 0.5 to 0.7 of the overall welding allowance, or 5 to 10 seconds before starting upsetting.

The exact nature of the proposed method is as follows.

The workpieces to be welded, clamped in welding machine jaws whereto voltage is applied, are continuously moved towards each other. At the initial stage of welding, when the ends of the workpieces are cold, the thermal efficiency of the fusion process is high, the welding current and the power consumed correspond to the optimum values. As the ends of the workpieces heat up, the lifetime of individual contacts forming at the workpiece end faces in fusion shortens, ejection of overheated metal in the form of sparks increases, and the power used for heating the workpieces decreases, which lowers the thermal efficiency of the fusion process. The thermal state of the ends of the workpieces being welded is indirectly characterized by such variables as the welding current or power consumed.

Investigations have shown that, in welding workpieces in a specific machine under predetermined conditions, the values of the welding current and of the power drawn from the mains correspond to a certain thermal state of the workpieces being welded.

Thus, measuring the welding current or the power drawn from the mains in the course of fusion of the workpieces allows monitoring the thermal state of the ends thereof. As the workpieces heat up, the welding current and power decrease. When the current or power has decreased to a value ranging within $\frac{2}{3}$ and $\frac{1}{2}$ of its initial value, the second step of moving the workpieces towards each other is started, at which, in addition to continuously moving the workpieces towards each other, one of these is set into oscillations along the direction of the movement.

For example, in welding rails of 65-kg/m weight, the current through the welding transformer primary circuit at the beginning of the first step (continuous fusion without oscillation) is of 200 to 250 A. As the rail ends heat up, the current decreases. When it drops to 100 to 150 A, the second step (continuous fusion without oscillation) is started.

From the initial moment of oscillating of one of the workpieces, the welding current rises to 400 to 500 A, ejection of overheated metal decreases, the rate of workpiece heating increases, and the thermal efficiency is enhanced by a factor of 1.5 to 2.

In welding large diameter pipes, the current through the transformer primary circuit at the beginning of the first step of welding is of about 1,000 A. As the pipe ends heat up, the current drops. When it decreases to about 600 A, the second step is started. As a result, the welding-current and power rise substantially (2 to 3 times), which speeds up the heating process.

In some events, with a view to simplify the welding process control, the initial moment of the step of moving the workpieces towards each other with oscillating one of these may be determined in terms of the fusion time or of the amount of the machine head travel.

In the former case, the welding time is measured and the step of moving the workpieces towards each other with oscillating one of these is started in a time ranging from 0.2 to 0.3 of the overall welding time.

For example, in welding large diameter pipes, the first step is completed in 50 s after the beginning of welding, and the overall welding time is of 180 s.

In the latter case, the travel of the workpieces is measured and the step of moving the workpieces towards each other with oscillating one of these is started after the total fusion of the workpiece ends has reached 0.2 to 0.3 of their thickness.

Thus, in welding pipes with a 20 mm thick wall, the first welding step is accomplished over the first 5 mm of the machine movable part travel, measured from the initial moment of fusion, after which a changeover to the second welding step—continuous fusion with oscillation—is made. After the workpieces have been heated up to the required degree, they are before upsetting moved towards each other at an increasing speed.

The proposed welding method contemplates the latter movement either without oscillating one of the workpieces or with oscillating it till the beginning of upsetting.

The oscillations are terminated before the beginning of upsetting, either after the total fusion of their ends has reached 0.5 to 0.7 of the overall fusion allowance or 5 to 15 s before the beginning of upsetting.

Thus, for example, in welding rails of a 65 kg/m weight, at the second step, the oscillations were terminated at the 14th millimeter of fusion; the total fusion allowance was of 20 mm.

To summarize, with reference to the figure, during a preheat time t1, no oscillations take place. However, once one of the four parameters mentioned above reaches a predetermined value, oscillation commences for a second time period t2, after which upset by a magnitude "1" takes place. Thermal efficiency is, thus, improved, in that, since the oscillatory motion is not imparted until the butt ends reach 650° to 800° C., flashing will occur when the metal is heated above 650° to 800° C., and thus has a high specific resistance. This results in flashing occurring at high thermal efficiency and with high electrical efficiency.

It is to be understood that various modifications to the above disclosure may be made without departing from the spirit and scope of this disclosure, and that the invention is limited only by the appended claims.

What is claimed is:

1. A method of resistance flash butt welding workpieces, said method comprising the steps of:
   preheating the workpieces;
   continuously, during said preheating step, moving the workpieces being welded toward each other without oscillation, thereby fusing them;
   simultaneously measuring at least one variable selected from a group of variables comprising fusion time, fusion current, power consumed, and length of the fused portion;
   imparting oscillations along the direction of the movement of at least one of the workpieces after said at least one variable has reached a preselected value which corresponds to heating of the contact region to 650° to 800° C.; and
   upsettting the workpieces.

2. A method as defined in claim 1, wherein the step of imparting oscillations along the direction of the movement of said at least one of the workpieces is started from the moment when the welding current or power has reached a value ranging from 0.66 to 0.5 of its initial value in fusion.

3. A method as defined in claim 1, wherein the step of imparting oscillations along the direction of the movement of said at least one of the workpieces is started in a time ranging from 0.2 to 0.3 of the overall welding time.

4. A method as defined in claim 1, wherein the step of imparting oscillations along the direction of the movement of said at least one of the workpieces is started after the total fusion of the workpiece ends has reached 0.2 to 0.3 of their thickness.

5. A method as defined in claim 4, wherein the step of imparting oscillations along the direction of the movement of said at least one of the workpieces is terminated before the beginning of upsetting after the total fusion of the workpiece ends has reached 0.5 to 0.7 of the total fusion allowance.

* * * * *